United States Patent [19]

Kido et al.

[11] Patent Number: 4,553,227
[45] Date of Patent: Nov. 12, 1985

[54] OPTICAL PICKUP

[75] Inventors: Fusayoshi Kido; Atsushi Takahashi, both of Yokohama; Shitta Shingu, Tokyo; Yoshinori Higuchi; Akira Yamada, both of Yokohama, all of Japan

[73] Assignee: Tokyo Shibaura Denki Kabushiki Kaisha, Kanagawa, Japan

[21] Appl. No.: 485,459

[22] Filed: Apr. 15, 1983

[30] Foreign Application Priority Data

Apr. 23, 1982 [JP] Japan .................................. 57-67190
Apr. 23, 1982 [JP] Japan .................................. 57-67193

[51] Int. Cl.$^4$ ................................................ G11B 7/08
[52] U.S. Cl. ........................................ 369/44; 369/45
[58] Field of Search ....................... 369/43, 44, 45, 46; 358/342

[56] References Cited

U.S. PATENT DOCUMENTS 4,386,823 6/1983 Musha ............................... 369/44 X
4,449,213 5/1984 Noborimoto et al. ................. 369/45

FOREIGN PATENT DOCUMENTS 2425782   3/1979  France .
54-146611 4/1979  Japan .
54-155802 6/1979  Japan .
56-130840 3/1981  Japan .
1211418   7/1970  United Kingdom .
2025110   3/1980  United Kingdom .
2090038   4/1982  United Kingdom .
2091902  11/1982  United Kingdom .

OTHER PUBLICATIONS

Patents Abstracts of Japan, vol. 7, No. 150 (P-207) (1295), Jun. 30, 1983.
Patents Abstracts of Japan, vol. 7, No. 278 (P-242) (1423), Dec. 10, 1983.

Primary Examiner—Robert L. Richardson
Attorney, Agent, or Firm—Cushman, Darby & Cushman

[57] ABSTRACT

An optical pickup assembly has a lens assembly movably supported in a magnetic gap of a yoke by flexible supporting members. Magnetic interaction between elements of the lens assembly and the yoke help center the lens assembly in the magnetic gap. Electromagnets move the lens assembly from the centered position. A light source, a collimator lens and a polarizing beam splitter are fixed with respect to the yoke.

16 Claims, 12 Drawing Figures

OPTICAL PICKUP

BACKGROUND OF THE INVENTION

The present invention relates to optical pickups for reading out data from high density recorded media, for example digital audio disks, and more particularly relates to structures for tracking data on the disk and for focusing optical systems of the optical pickups.

Apparatus for reading out data optically from a disk is already known and an example is shown in FIG. 1. The apparatus has an optical system 100, a servo driver 102 for moving optical system 100 to track data on the disk and focus optical system 100 with respect to the data, and a servo amplifier 104. A numeral 106 denotes a recorded medium, for example a disk.

Optical system 100 has a light source 108 which may be a laser emitting diode, a collimator lens 110, a polarizing beam splitter 112, a quarter-wave plate 114, an object lens 116, a focusing lens 118 and a photo detector 120. These parts of optical system 100 are assembled as a unit. Light from source 108 passes through collimator lens 110, polarizing beam splitter 112 and quarter-wave plate 114, and is then focused by objective lens 116 to make a very small light spot on a surface of recorded medium 106. Reflected light containing information from disk 106 travels through object lens 116, quarter-wave plate 114 and polarizing beam splitter 112 in a reverse direction so that it passes through focusing lens 118 and is focused on photo detector 120 as a light spot. Photo detector 120 converts the light into an electric signal on line 122 which signal includes a data signal and a location signal. The location signal includes tracking error information and focusing error information. The location signal is applied to amplifier 104 on line 124 wherein it is amplified. The amplified location signal is then transmitted to servo driver 102 for adjusting optical system 100 to minimize the tracking error and the focusing error.

In the known optical pickup mentioned above, optical system 100 including objective lens 116, focusing lens 118, photo detector 120, light source 108, etc. is formed as a single unit. Optical system 100 is connected to a frame of the optical pickup by resilient supporting members (not shown). Further, servo driver 102 moves the entirety of optical system 100 electromagnetically. Therefore, the supporting members must be relatively strongly resilient, because of the total weight of optical system 100. As a result, a relatively large amount of electric power is required for tracking and focusing. Therefore, the optical pickup has low driving sensitivity and degraded focusing and tracking control characteristics. Further, the large power consumption for servo driving generates heat which deteriorates the laser diode of light source 108, shortening its life.

SUMMARY OF THE INVENTION

The present invention overcomes these drawbacks.

In the present invention, only that portion of the optical system which must be movable for tracking and focusing is moved. That is, the movable portion does not include the light source, and may not include the collimator lens and the polarizing beam splitter, in distinction with the prior art. The movable portion including at least the objective lens can be lighter compared with the movable portion in the prior art. Further, in the present invention, the movable portion is supported in part by means of interactions between magnetic fields and magnetic supporting members. As a result, the supporting members need not be strongly resilient. The light weight of the movable portion and the weaker resiliency of the resilient supporting member results in increased driving sensitivity for tracking and focusing. The response characteristics for tracking and focusing movements are thereby improved and the power necessary for driving is also decreased.

The optical pickup of the present invention includes a magnetic yoke having first and second surfaces facing each other which form a magnetic gap. A first end of a first flexible support is fixed to the first surface of the yoke. The first flexible support is flexible in a first direction. A first end of a second flexible support is fixed to the second end of the first flexible support. The second flexible support is flexible in a second direction perpendicular to the first direction. An objective lens is fixed to the second end of the second flexible support.

A first permanent magnetic support positions the second end of the first flexible support in the magnetic gap by means of the magnetic force created by the interaction of magnetic fields generated by the yoke. A second permanent magnetic support positions the second end of the second flexible support in said magnetic gap by the magnetic force created by the interaction of magnetic fields generated by the yoke. A first electromagnet alters the distribution of the magnetic field in the magnetic gap to move the object lens in the first direction.

Similarly, a second electromagnet alters the distribution of the magnetic field in the magnetic gap to move the object lens in the second direction.

Light is provided to the objective lens by a light source fixed with respect to the yoke. Reflected light received by the objective lens from the medium is focused by a lens and then received by a photo detector. Both the focusing lens and photo detector are not fixed to the yoke directly.

BRIEF DESCRIPTION OF THE DRAWINGS

The invention will be described in detail with reference to the accompanying drawings, in which.

DETAILED DESCRIPTION OF THE PREFERRED EMBODIMENT

Figure 1:
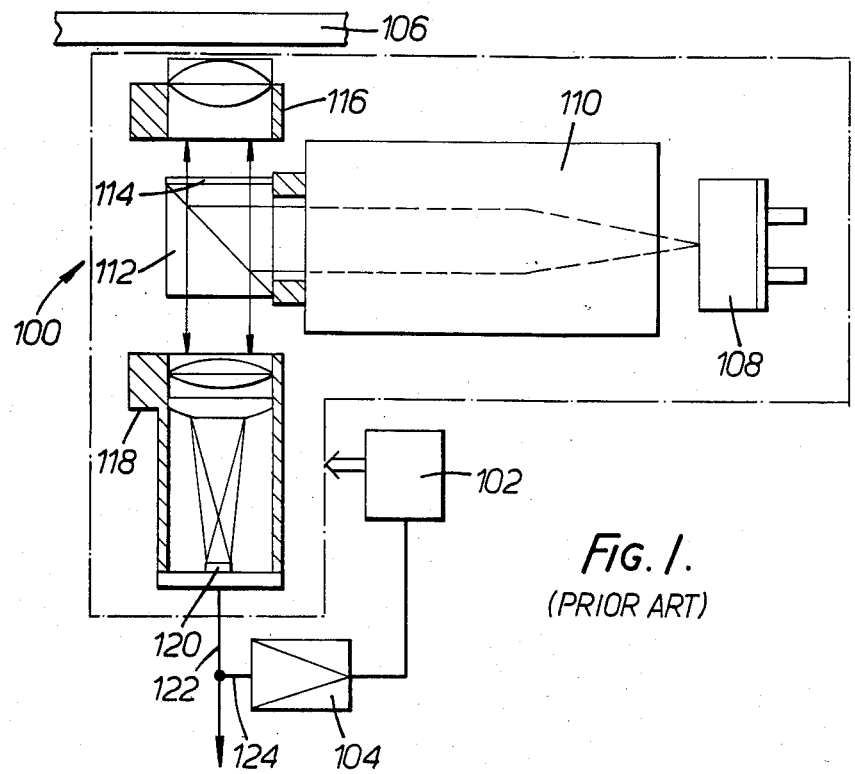
FIG. 1 schematically shows a prior art optical pickup.
Figure 2:
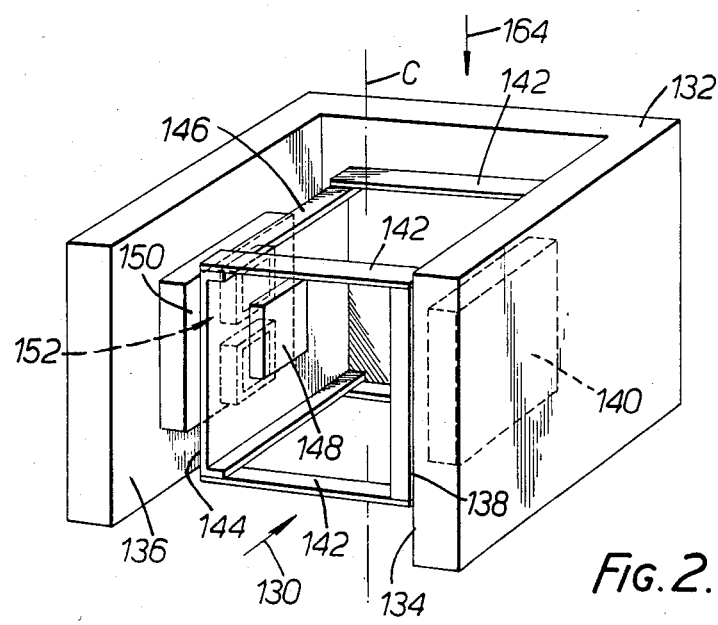
FIG. 2 shows a perspective view of an optical pickup of the present invention with portions removed for clarity.
Figure 3:
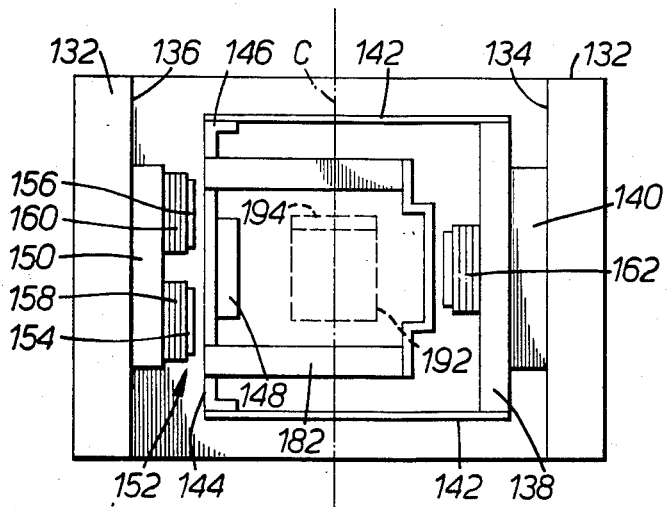
FIG. 3 shows a front view of the optical pickup shown in FIG. 2.

FIG. 2 shows a perspective view of an optical pickup of the present invention (the rest of the optical system is not shown) and FIG. 3 shows a front view of the invention observed from a direction indicated by an arrow 130 in FIG. 2.

A U-shaped yoke 132 made of soft magnetic material has a pair of surfaces 134 and 136 facing each other and forming a magnetic gap therebetween. A base 138 is attached to surface 134 of yoke 132 through a permanent magnet 140. Four flexible supporting members 142, which, in the preferred embodiment, are made of phosphor bronze and are 10 microns in thickness, 1 mm in width and 15 mm in length, are attached at one of their ends to the four corners of base 138. Supporting members 142 are positioned parallel to each other and extend perpendicular to an optical axis C of an object lens (not shown in FIG. 2 but will be described hereinafter). Supporting members 142 are flexible in a direction parallel to optical axis C. At the other ends of supporting members 142, a movable member 144 is provided. Movable member 144 has a plate 146 and a magnetic member 148 attached on plate 144. On surface 136 of yoke 132, another permanent magnet 150 is mounted. Permanent magnets 140 and 150 are mounted to yoke 132 so as to make serial connections with respect to their poles.

An electromagnet 152 is provided on permanent magnet 150. Electromagnet 152 has two pole pieces (cores) 154 and 156 and two coils 158 and 160 wound around pole pieces 154 and 156, respectively. A line passing through the centers of both coils 158 and 160 is parallel to both optical axis C and the direction which flexible supporting members 142 are able to move. Another electromagnet 162 is provided on base 138. Electromagnet 162 also has two pole pieces (cores) and a coil wound around each pole piece, respectively. A line passing through the centers of the coils of electromagnet 162 is perpendicular to optical axis C, and parallel to the direction which other flexible supporting members (described hereinafter) are able to move. Coils 158 and 160 are connected serially and their winding directions are reversed from each other to generate opposite magnetic fields when current flows therein. The coils of electromagnet 162 are also connected serially and their winding directions are reverse from each other.

Figure 4:
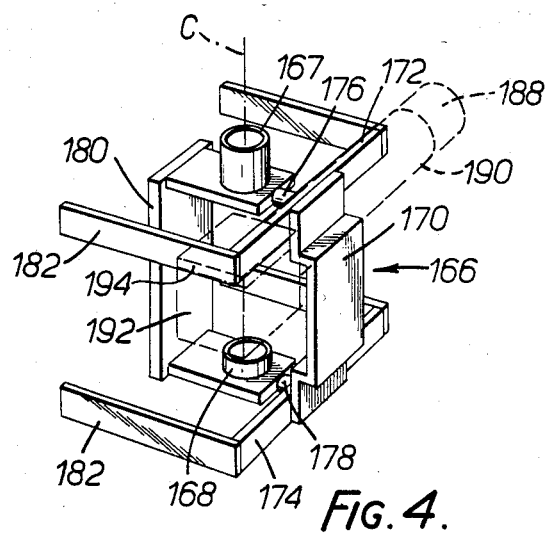
FIG. 4 shows a perspective view of a lens assembly used in the optical pickup shown in FIG. 2.
Figure 5:
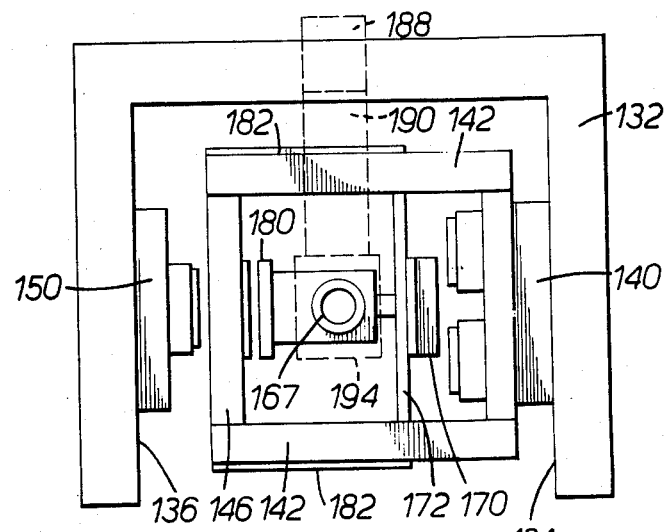
FIG. 5 shows a top view of the optical pickup shown in FIG. 2.

A lens assembly will now be explained with reference to FIG. 4 which shows a perspective view of a lens assembly and FIG. 5 which shows a top view of the optical pickup shown in FIG. 2 observed from a direction indicated by an arrow 164 in FIG. 2. Lens assembly 166 has an object lens 167 having an optical axis C, a focusing lens 168, a photo detector (not shown) behind focusing lens 168 and a magnetic member 170. At opposite ends of magnetic member 170, supporting plates 172 and 174 are attached, respectively. Object lens 167 and focusing lens 168 are connected to supporting plates 172 and 174 through supporting rods 176 and 178, respectively. Object lens 167, focusing lens 168, the photo detector and magnetic member 170 are thereby a single unit. The optical axis of focusing lens 168 is the same as the optical axis of objective lens 167. Supporting rods 176 and 178 and supporting plates 172 and 174 are made of magnetic material. An iron plate 180 is attached to objective lens 167 and focusing lens 168 for increasing the mechanical strength of lens assembly 166 and for increasing the magnetic efficiency of a magnetic circuit to be described. At the ends of supporting plates 172 and 174, four flexible supporting members 182 are attached at one of their ends. The other ends of flexible members 182 are attached to plate 146 of movable member 144 (see FIG. 3). Supporting members 182 are made of phosphor bronze and are 10 microns in thickness, 1 mm in width and 10 mm in length. Supporting members 182 are aligned parallel to each other and extend parallel to supporting member 142, but are flexible in a direction perpendicular to optical axis C.

Thus, lens assembly 166 is supported in the magnetic gap of magnetic yoke 132 and is movable in both directions perpendicular and parallel to optical axis C. The position of lens assembly 166 is determined by the resilient forces of flexible members 142 and 182, magnetic pull forces between permanent magnets 140 and 150 and magnetic members 148 and 170 and the weight of lens assembly 166, etc. In the optical pickup, the direction parallel to optical axis C is the direction in which focusing is adjusted and the direction perpendicular to optical axis C is the direction in which tracking is adjusted.

The optical pickup of the invention further has a light source 188, a collimator lens 190, a polarizing beam splitter 192 and a quarter-wave plate 194 (drawn in dotted line in FIGS. 3, 4 and 5), which are supported by yoke 132. Polarizing beam splitter 192 and quarter-wave plate 194 are positioned between object lens 167 and focusing lens 168.

According to the present invention, the movement of lens assembly 166 for focusing and tracking is controlled by electromagnets 152 and 162. The principle of operation of the present invention will be explained with respect to FIGS. 6 and 7. The explanation below relates to the principle by which focusing can be effected. Those skilled in the art will readily appreciate that the same principle is employed to control tracking.

Figure 6:
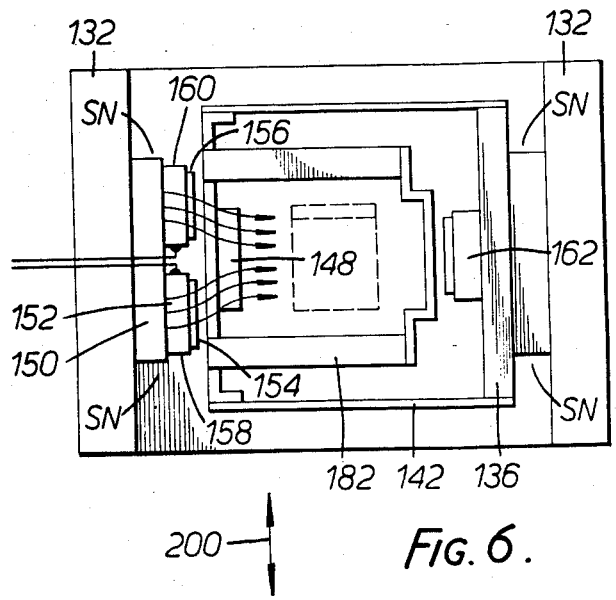
FIG. 6 shows a model for explaining the principle of actuation of the lens assembly.

Flexible supporting members 142 are flexible in a direction indicated by an arrow 200 as shown in FIG. 6. When electromagnet 152 is not activated, the magnetic field distribution near both pole pieces 154 and 156 are the same, and magnetic member 148 positions itself at the center of electromagnet 152. The position of magnetic member 148 is thus determined both by the resilient force of flexible supporting members 142 and, the interaction of the magnetic field generated by permanent magnet 150 with magnetic member 148. Obviously, the weight of the lens assembly also influences the position of magnetic member 148.

Figure 7:
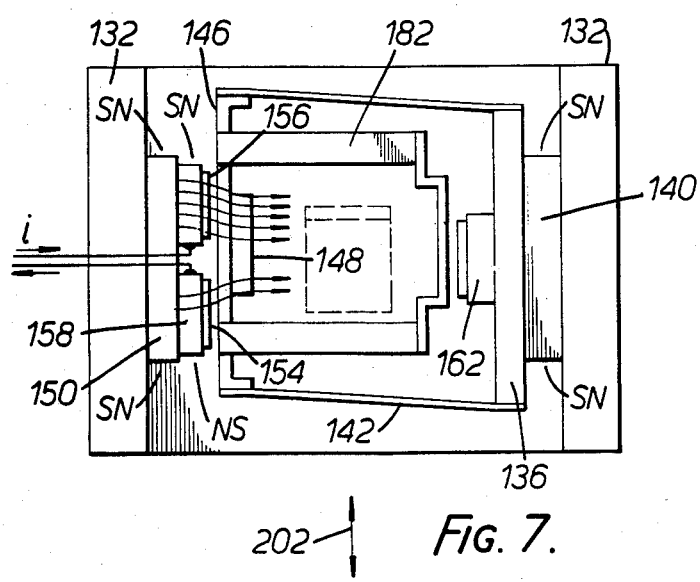
FIG. 7 shows another model for explaining the principle of actuation of the lens assembly.

When a current i flows in coils 158 and 160 of electromagnet 152, coils 158 and 160 produce magnetic fields having opposite polarities to each other, for example as shown in FIG. 7. The distribution of the magnetic field produced by permanent magnet 150 is thereby altered so that the magnetic field near pole piece 156 is strengthened and the magnetic field near pole piece 154 is weakened. This causes magnetic member 148 to move toward pole piece 156. The object lens (not shown) is attached to plate 146 through supporting members 182. Therefore, the object lens moves in a direction indicated by an arrow 202 in FIG. 7 with magnetic member 148. When the current i flows in a reverse direction in coils 158 and 160, magnetic member 148 and the object lens move toward pole piece 154. In this manner, the focusing of the object lens is accomplished.

Figure 8:
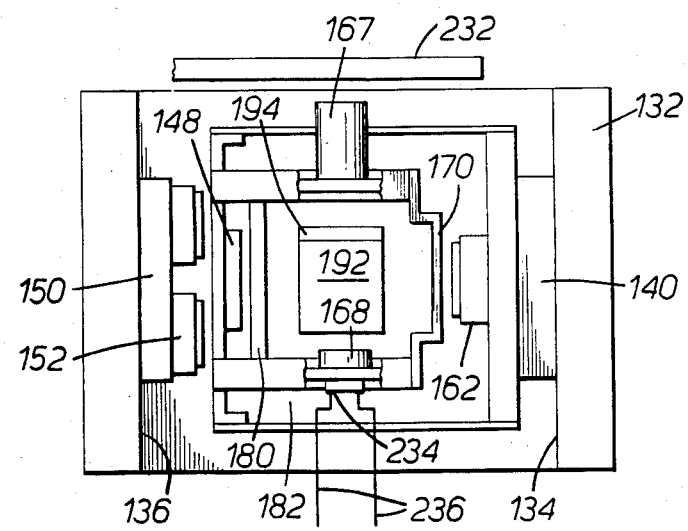
FIG. 8 shows a front view of the optical pickup shown in FIG. 2.

The overall operation of the present invention will now be explained with reference to FIG. 8. Object lens 167 is movably supported in the magnetic gap formed between surfaces 134 and 136 of yoke 132 by flexible supporting members 142 and 182, permanent magnets 140 and 150 produce fields which interact with magnetic members 148 and 170. The light emitted from source 188 (not shown in FIG. 8) fixed to yoke 132 passes through collimator lens 190 (not shown in FIG. 8), polarizing beam splitter 192 and quarter-wave plate 194 and is then focused by object lens 167 on a disk 232 as a very small optical spot. Reflected light from a surface of disk 232 travels a reversed optical path, and passes polarizing beam splitter 192 to be focused on photo detector 234 by focusing lens 168. The light focused on photo detector 234 is then converted to an electric signal. The electric signal includes a data signal corresponding to a signal recorded in disk 232 and a location signal including focusing error information and tracking error information. The electric signal is led out through lead wires 236, and the focusing error signal and the tracking error signal are separated. The separated focusing error signal is amplified by a servo amplifier (not shown) and is input to electromagnet 152 to cause object lens 167 to move in a direction parallel to optical axis C. The separated tracking error signal is also amplified by another servo amplifier (not shown) and is input to electromagnet 162 to carry out tracking control. Object lens 167 is thereby moved in a direction perpendicular to optical axis C.

According to the present invention, a movable portion of an optical pickup which includes the object lens does not include the light source, the collimator lens and the polarizing beam splitter. Therefore, the movable portion can be light and the flexible supporting members can have relatively weak resiliency. Further, the movable portion is also supported by its attraction to the permanent magnets and this also enables the resiliency of the flexible supporting members to be less strong. The light weight of the movable portion and the weaker resiliency of the flexible support members enables the driving sensitivities of tracking and focusing controls to be increased. High sensitivity for tracking and focusing improves characteristics of tracking and focusing actuation. It also makes the servo amplifier simplified. Further, according to the present invention, the high sensitivity reduces the electric power necessary for driving and the heat that must be dissipated is reduced. As a result, the laser diode in the light source does not deteriorate as much. Furthermore, thermal expansion resulting from the heat also becomes less, and deterioration of the actuating characteristics caused by the heat can be reduced.

In the described embodiment, the point at which a force is applied to the movable portion and the center of gravity of the movable portion are close to each other. Therefore, any movement caused by a weight imbalance can be decreased and the amplitude and phase characteristics of the movable portion can be improved.

Figure 9:
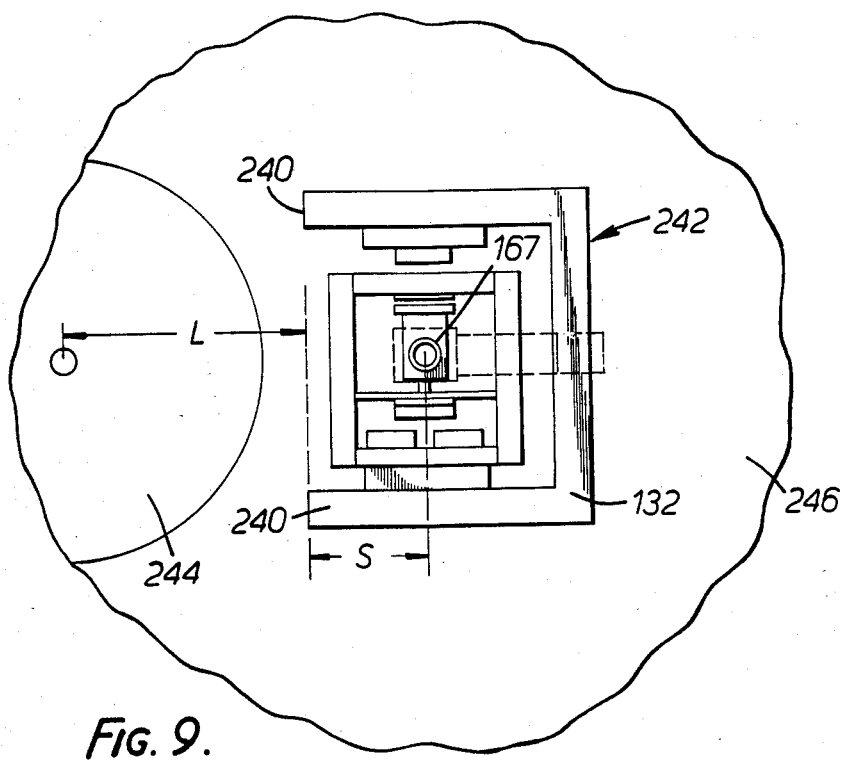
FIG. 9 illustrates the relation between a motor and the optical pickup.

When the optical pickup of the present invention is employed with apparatus for reading data from a disk, a motor for rotating the disk can be made with a comparatively large diameter. As shown in FIG. 9, yoke 132 has open ends 240. The distance S between the center of object lens 167 and end 240 is relatively small compared with the size of optical pickup 242. This means that the distance L between the center of a motor 244 for rotating a disk 246 and end 240 of optical pickup 242 can be large, yet still enable optical pickup 242 to read the most inner information track on disk 246. Therefore, a large motor can be used as motor 244 to provide a steady rotating torque with low power consumption.

According to the present invention, the positions of the permanent magnet, the magnetic member and the electromagnet are not limited to the embodiment described above. The permanent magnet may be attached to the flexible supporting member and the magnetic member may be attached on the yoke. The magnetic member may also be a permanent magnet. Further, the electromagnet may be attached to the flexible supporting member. In fact, the magnetic member may form the core of the electromagnet.

Figure 10:
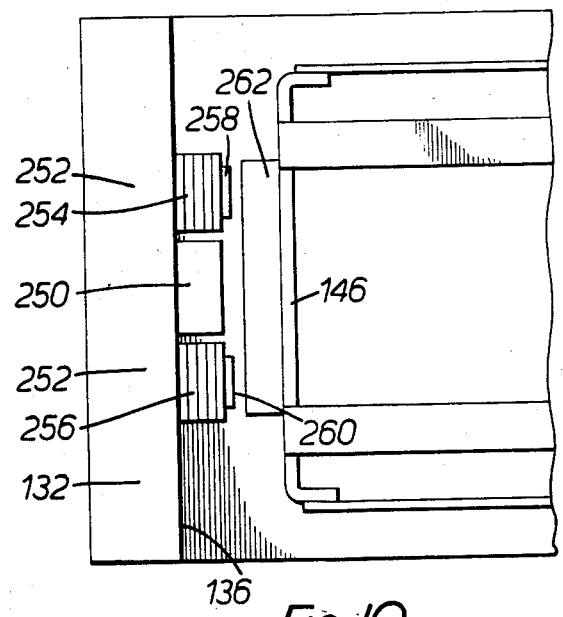
FIG. 10 shows a front view of a portion of another embodiment of the present invention.

Thus, FIG. 10 shows an embodiment in which a magnetic member 250 is attached on surface 136 of yoke 132 and an electromagnet 252 is also provided on surface 136 of yoke 132. Electromagnet 252 has two coils 254 and 256 and two cores 258 and 260. A permanent magnet 262 is provided on plate 146.

Figure 11:
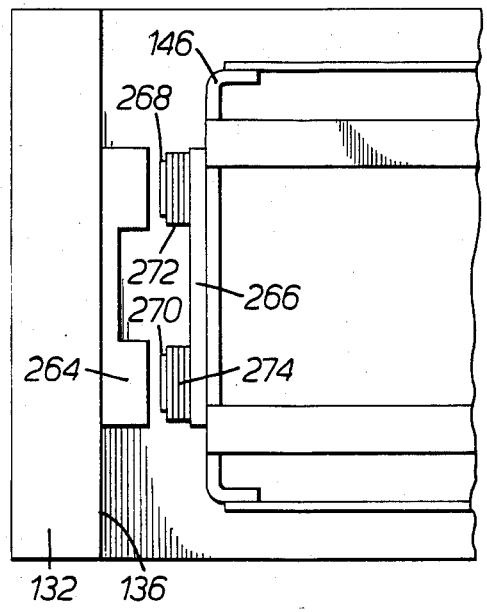
FIG. 11 shows a front view of a portion of still another embodiment of the present invention.

FIG. 11 shows a different type of embodiment in which a permanent magnet 264 is provided on surface 136 of yoke 132. A magnetic member 266 having two pole pieces 268 and 270 is attached to plate 146 and two coils 272 and 274 are wound around pole pieces 268 and 270, respectively. Coils 272 and 274 and pole pieces 268 and 270 form an electromagnet.

Figure 12:
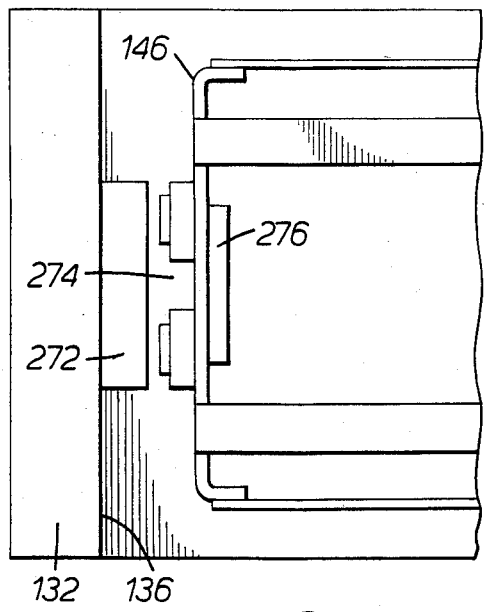
FIG. 12 shows a front view of a portion of yet another embodiment of the present invention.

FIG. 12 shows yet another embodiment. A permanent magnet 272 is attached to surface 136 of yoke 132. An electromagnet 274 is attached to plate 146. Another permanent magnet 276 is also attached to plate 146.

In the above discussion, the two coils of the electromagnet are serially connected. However, they may be connected parallel to form opposite magnetic fields from each other.

While the invention has been described in connection with what is presently considered to be the most practical and preferred embodiments, it is to be understood that the invention is not to be limited to the disclosed embodiments but to the contrary, is intended to cover various modifications and equivalent arrangements included within the spirit and scope of the appended claims. For example, at least the photo detector may be fixed with respect to the yoke. Accordingly, the claims are to be interpreted so as to encompass all such modifications and equivalent structures.

What is claimed is:

1. An optical pickup comprising:
   a magnetic yoke having first and second surfaces facing each other, said first and second surfaces defining a magnetic gap therebetween;
   at least one first flexible supporting member having first and second ends, said first end being fixed to said yoke at said first surface portion and said at least one first flexible supporting member being flexible in a first direction;
   a first movable member attached to said second end of said at least one first flexible supporting member;
   at least one second flexible supporting member having first and second ends, said first end of said second member being fixed to said first movable member, said second member being flexible in second direction perpendicular to said first direction;
   a second movable member attached to said second end of said at least one second flexible supporting member;
   an objective lens fixed to said second movable member and having an optical axis;
   first permanent magnetic supporting means for producing a first magnetic field to support said first movable member in said magnetic gap;

second permanent magnetic supporting means for producing a second magnetic field to support said second movable member in said magnetic gap;

first electromagnet means for altering the distribution of said first magnetic field to move said objective lens in said first direction;

second electromagnet means for altering the distribution of said second magnetic field to move said objective lens in said second direction;

light source means for providing light to said objective lens;

a focusing lens for receiving light from said objective lens; and a photo detector which receives light from said focusing lens.

2. An optical pickup as in claim 1 wherein said light source is fixed with respect to said yoke.

3. An optical pickup as in claim 2 wherein said focusing lens and said photo detector are fixed with respect to said objective lens.

4. An optical pickup as in claim 1 wherein said first magnetic supporting means includes a first permanent magnet and said second magnetic supporting means includes a second permanent magnet.

5. An optical pickup as in claim 1 wherein said first flexible supporting member is flexible in a direction parallel to said optical axis.

6. An optical pickup as in claim 1 wherein said first permanent magnetic supporting means comprises a first permanent magnet and a first magnetic member.

7. An optical pickup as in claim 6 wherein said first permanent magnet is provided on said second surface of said yoke and said first magnetic member is provided at said first movable member.

8. An optical pickup as in claim 7 wherein said first electromagnet means is provided on said first permanent magnet.

9. An optical pickup as in claim 1 wherein said second permanent supporting means comprises a second permanent magnet and a second magnetic member.

10. An optical pickup as in claim 9 wherein said second permanent magnet is provided on said first surface of said yoke and said second magnetic member is provided at said second movable member.

11. An optical pickup as in claim 10 wherein said second electromagnet means is provided on said second permanent magnet.

12. An optical pickup as in claim 1 wherein said first electromagnet means includes two first pole pieces arranged along said first direction and two first coils wound around said two first pole pieces, respectively, and said second electromagnet means includes two second pole pieces arranged along said second direction and two second coils wound around said two second pole pieces respectively.

13. An optical pickup as in claim 12 wherein the winding direction of each of said first coils is reversed with respect to the other, and the winding direction of each of said second coils is reversed with respect to the other.

14. An optical pickup as in claim 1 wherein said focusing lens and said photo detector are fixed with respect to said yoke.

15. An optical pickup comprising:

a magnet yoke having first and second portions facing each other, said first and second portions defining a magnetic gap therebetween;

a plurality of first flexible supporting members each having first and second ends, each of said first ends being fixed to said first portion of said yoke, said first flexible supporting members being flexible in a first direction;

a movable member attached to said second ends of said first flexible supporting members;

second flexible supporting members having first and second ends, said first ends of said second members being fixed to said movable member, said second flexible supporting members being flexible in a second direction perpendicular to said first direction;

a lens assembly including an object lens, a focusing lens, a photo detector and a first magnetic member, said objective lens having an optical axis parallel to said first direction, and said object lens, said focusing lens and said photo detector being connected to said first magnetic member, said first magnetic member being fixed to said second ends of said second flexible members;

a first permanent magnet attached to said first portion of said yoke;

a first electromagnet attached to said first permanent magnet;

a second magnetic member provided on said movable member;

a second permanent magnet provided on said second portion of said yoke;

a second electromagnet provided on said second permanent magnet; and a light source fixed to said yoke.

16. An optical pickup comprising:

a magnetic yoke having first and second surfaces facing each other, said first and second surfaces defining a magnetic gap therebetween;

at least one first flexible supporting member having first and second ends, said first end being fixed to said yoke at said first surface portion and said at least one first flexible supporting member being flexible in a first direction;

a first movable member attached to said second end of said at least one first flexible supporting member;

at least one second flexible supporting member having first and second ends, said first end of said second member being fixed to said first movable member, said second supporting member being flexible in a second direction perpendicular to said first direction;

a second movable member attached to said second end of said at least one second flexible supporting member;

an objective lens fixed to said second movable member and having an optical axis;

first permanent magnetic supporting means for producing a first magnetic field to support said first movable member in said magnetic gap;

second permanent magnetic supporting means for producing a second magnetic field to support said second movable member in said magnetic gap;

first electromagnet means for altering the distribution of said first magnetic field to move said objective lens in said first direction;

second electromagnet means for altering the distribution of said second magnetic field to move said objective lens in said second direction;

light source means for providing light to said objective lens; and means for generating an electric signal related to light received from said objective lens.

* * * * *